April 10, 1934.   C. E. SMITH   1,954,061
DEVICE FOR GROOVING SAFETY GLASS
Filed Oct. 19, 1932
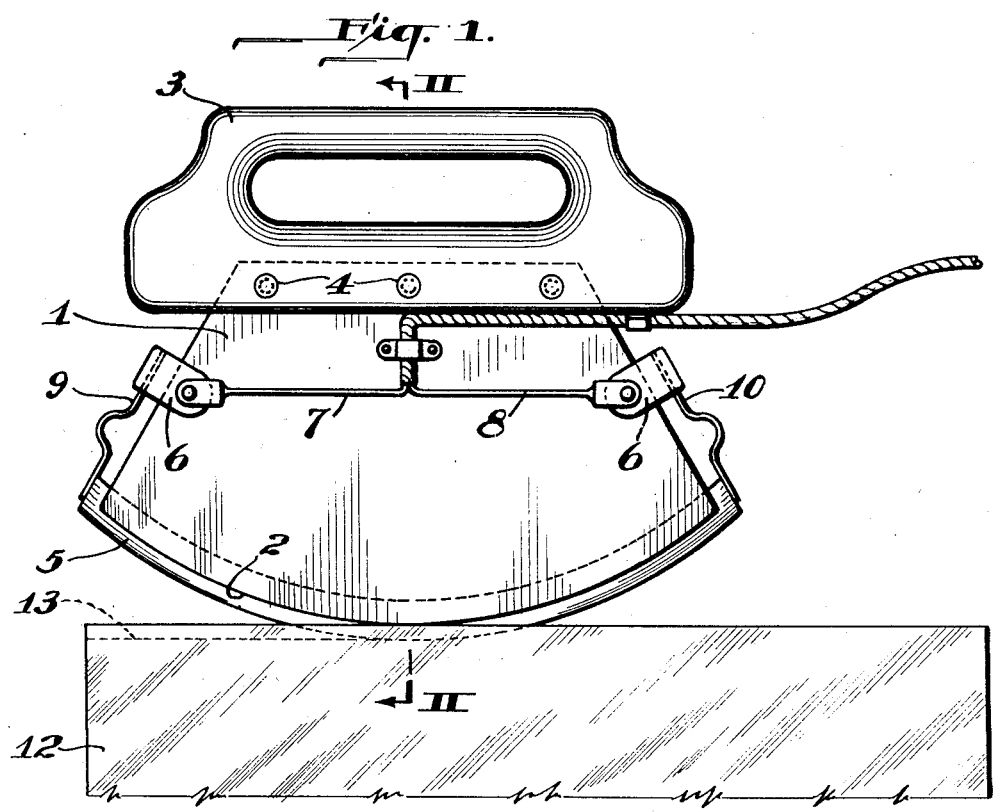
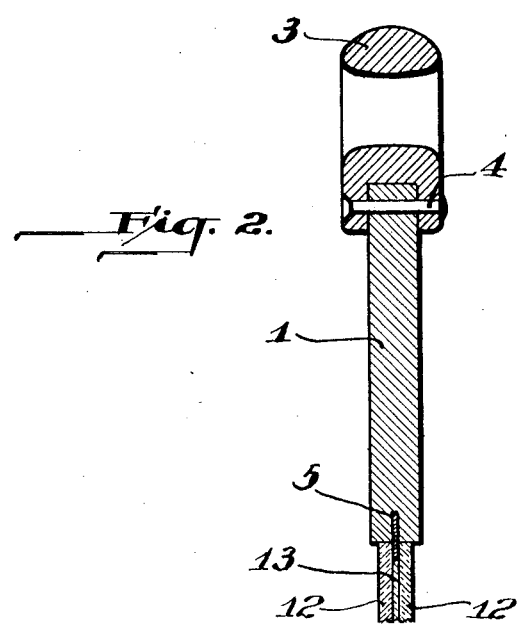
INVENTOR
Charles E. Smith Patented Apr. 10, 1934

1,954,061

UNITED STATES PATENT OFFICE 1,954,061

DEVICE FOR GROOVING SAFETY GLASS

Charles E. Smith, Creighton, Pa., assignor to Duplate Corporation, a corporation of Delaware Application October 19, 1932, Serial No. 638,481

2 Claims. (Cl. 219—29)

The invention relates to a device for grooving safety glass. Such glass ordinarily comprises a pair of glass sheets with an interposed sheet of reinforcing material such as cellulose nitrate (celluloid), or cellulose acetate, to which the glass sheets are cemented. In order to guard against edge separation due to the penetration of moisture at the edges of the laminated plate, it is customary to groove out the reinforcing material around the edge of the plate to the depth of about one-eighth of an inch, and fill the groove thus provided, with a sealing material, such as pitch. The present device is designed for performing the operation of grooving out the reinforcing material, and the invention has for its object the provision of an improved device for accomplishing this function, which is of simple construction, and which can be used without difficulty by an operator with little skill or experience. One embodiment of the invention is illustrated in the accompanying drawing, wherein:

Figure 1 is a side elevation of the apparatus. And Fig. 2 is a section on the line II—II of Fig. 1.

Referring to the drawing, 1 is a plate or holder having a curve or rocker 2 at its front edge and carrying at its rear edge a handle 3. This plate is composed of an insulating composition such as asbestos adapted to resist a considerable degree of heat. The handle is secured to the plate by means of transverse rivets 4. Seated in the front edge of the plate is a ribbon 5 of high electrical resistance such as nickel chromium, the ribbon being arranged so that it projects beyond the edge of the plate 1, a distance equal to the depth of the groove which is to be formed in the laminated plate. Also secured to the plate are a pair of copper terminals 6 connected to the lead-in wires 7 and 8 to which a current is supplied from suitable source. One terminal 6 is secured to one end of the ribbon by means of the conductor 9, while the other terminal is secured to the other end of the ribbon by the conductor 10. The current supplied through the ribbon is such to heat it to a temperature sufficient to burn out the reinforcing at the edge of the laminated sheet.

As indicated in Fig. 2, the laminated sheet comprises a pair of glass sheets 12—12, with an interposed reinforcing 13 of plastic material such as celluloid.

In using the apparatus, the ribbon 5, which is of a thickness substantially equal to that of the plastic sheet 13, is applied against the edge of the laminated sheet, as indicated in Figs. 2 and 3, the heated ribbon burning out the celluloid until the edge of the plate 1 engages the edges of the glass sheets, thus limiting the depth of the groove which is cut. The plate is then rocked, first in one direction and then in the other, until the entire length of the ribbon is caused to engage the edge of the celluloid, thus forming a groove which is equal in length to the ribbon 5. The device is then moved along the laminated plate to a new position and the operation repeated, the device being positioned so that in its rocking movement one end of the ribbon will overlap the groove already formed in the plate. This procedure is followed until the entire periphery of the laminated plate has been grooved. The rocker form of the plate and ribbon renders the operation much easier than is the case with a device having a straight ribbon, as no difficulty is experienced in starting the device in the position indicated in Fig. 2, after which the ribbon is guided by the slot already formed during the further step of rocking the device back and forth, thus avoiding the difficulty in starting the operation which is experienced with a straight ribbon. The construction involved is relatively cheap, and the device may be operated for long periods without replacement or repair. Other advantages will be readily apparent to those skilled in the art.

What I claim is:

1. An edge grooving device for safety glass comprising a holder of insulating material in the form of a plate having its front edge curved in the direction of its length to form a rocker, a handle for the holder, a ribbon of resistance material seated edgewise in the front edge of the holder with its edge projecting beyond the edge of the holder and also curved to correspond to the curve of the edge of the holder, and connections whereby a current of electricity may be passed through the ribbon to heat it.

2. An edge grooving device for safety glass comprising a holder of insulating material in the form of a plate having its front edge curved, forming a rocker element of greater width than the edge of the plate to be grooved, a handle secured to the other edge of the holder plate, a ribbon of resistance material seated edgewise in the plate with its edges projecting beyond the edge of the holder a distance equal to the depth of the groove to be cut and having its outer edge parallel with the curved edge of the plate, and connections whereby a current of electricity may be passed through the ribbon to heat it.

CHARLES E. SMITH.